United States Patent [19]

Grossman et al.

[11] Patent Number: 4,599,370

[45] Date of Patent: Jul. 8, 1986

[54] POWDERED ELASTOMER DRY BLENDS AND PROCESS FOR INJECTION MOLDING

[75] Inventors: Richard F. Grossman, Shelton; Francis W. McKane, Jr., Bridgeport, both of Conn.

[73] Assignee: Plastic Specialties and Technologies, Inc., Cleveland, Ohio

[21] Appl. No.: 678,703

[22] Filed: Dec. 6, 1984

[51] Int. Cl.$^4$ .............. C08K 3/04; C08K 3/34; C08K 9/12; C08K 9/04

[52] U.S. Cl. .............. 523/200; 523/201; 523/215; 523/216; 523/333; 524/313; 524/426; 524/447; 524/448; 524/451; 524/456; 524/496; 524/529; 524/534; 524/535

[58] Field of Search .............. 523/200, 201, 333, 215, 523/216; 524/426

[56] References Cited

U.S. PATENT DOCUMENTS

| | | | |
|---|---|---|---|
| 3,773,708 | 11/1973 | Takahashi et al. | 524/427 |
| 3,985,703 | 10/1976 | Ferry et al. | 523/201 |
| 4,032,501 | 6/1977 | Schulz | 524/571 |
| 4,060,510 | 11/1977 | Himes | 524/425 |
| 4,138,375 | 2/1979 | Berg et al. | 523/334 |
| 4,269,740 | 5/1981 | Woods et al. | 524/776 |
| 4,278,576 | 7/1981 | Goldman | 523/201 |
| 4,348,492 | 9/1982 | Shasha et al. | 523/201 |
| 4,374,941 | 2/1983 | Sandstrom | 523/334 |

FOREIGN PATENT DOCUMENTS 1507691 4/1978 United Kingdom .
1508134 4/1978 United Kingdom .

OTHER PUBLICATIONS

Derwent Abstract 35384C/20 J55045778(3-80) Matsushita.
Derwent Abstract 08553B/05 J53143633(12-78) Yamauchi Gum Kogyo.
Derwent Abst. 51739B/28 J54069164 (6-79) Asahi Chem.

*Primary Examiner*—Herbert J. Lilling
*Attorney, Agent, or Firm*—Wood, Herron & Evans

[57] ABSTRACT

A powdered elastomeric composition is formed by combining a powder elastomer and a powdered predispersion of liquid or pasty components, such as process oil, lubricants and waxes, in a dry powder filler. The powdered predispersion is combined with the powder elastomer using a ribbon blender to form a consistent homogenous powder dry blend which can be directly injection molded without any additional mixing other than that occurring in the extruder portion of the injection molding apparatus.

21 Claims, No Drawings

POWDERED ELASTOMER DRY BLENDS AND PROCESS FOR INJECTION MOLDING

BACKGROUND OF THE INVENTION

Vulcanized elastomeric articles are commonly produced by transfer, compression, and injection molding. Each of these processes has advantages and drawbacks and fills a particular segment of the market. Injection molding has the advantages of high output, consistency, and ease of automation. Therefore, despite the need for higher capital investment it is the fastest growing segment.

Injection molding of elastomeric articles is presently carried out by feeding an injection molding press with a continuous strip or pellets of premixed elastomeric compound. The compound generally includes a base elastomer, fillers, plasticizers, process aids, anti-degradants, activators, accelerators, colors and cross linking agents. The elastomer is premixed with these additional components to form a homogeneous mass.

In order to obtain the uniform homogenous mass the elastomer and additives including the vulcanizing agent and accelerator are typically premixed in a high shear internal mixer such as a Banbury or a two roll mill. This high shear mixing action increases the temperature of this elastomer formulation, developing a heat and shear history in the elastomer, and, in some cases, may initiate partial cross-linking.

Another conventional technique for premixing or compounding elastomers is a two pass mixing cycle utilizing a mixer such as a Banbury mixer. In the first cycle the bulk of the components, with the exception of the cross linking agent itself, is incorporated into a homogeneous base compound in a high shear mixer. The heat generated during this first cycle is so great that the addition of cross linking agents would initiate the cross linking and result in a scorched composition. In the second stage of the technique the cross linking agent is added to the product of the first cycle at a lower temperature. This method reduces the scorch problem but nevertheless creates a heat history in the elastomer. The presence of the cross-linking agent and accelerator in the final blend still decreases its shelf life since some vulcanization or cross-linking occurs even at room temperature.

It has been proposed to maintain the elastomer separate from the curing agent with the curing agent maintained or encased in a non-cross-linkable polymer. This would tend to avoid premature crosslinking. One such attempt is disclosed in Callan U.S. Pat. No. 3,976,530. Callan discloses forming a two component elastomeric tape wherein one component is a first polymer having a vulcanizing agent incorporated therein and wherein the polymer is substantially non-cross-linkable by the vulcanizing agent. The second component of the polymeric tape is a second polymer curable by the vulcanizing agent contained by this first polymer. The two components of the tape are joined side by side. Such methods are expensive and often require extensive milling to provide a homogenous dispersion.

Abbott U.S. Pat. No. 3,941,767 and an article entitled *Injection Molding of Conventional Formulations Based on Starch Encased Powder Rubber* in the *Journal of Elastomers and Plastics,* Vol. 7, April, 1975, p. 93, report injection molding of starch encased powder elastomers. These references disclose that a starch encased elastomer can be fed into an injection molding machine and require less preliminary mixing. These starch encased powders however have limited application because polysaccharides are poor rubber additives having very bad water and chemical resistances compared to standard reinforcements such as carbon black, silica, clay, talc, etc. Further the article particularly points out that a special masticating feed screw is required.

Buchanan et al U.S. Pat. No. 3,673,136 discloses that a dry polysaccharide elastomer latex coprecipitate can be ground to form a free flowing fine powder. A powdered blend can be formed by blending powder curatives with the powder elastomer to give storage stable powder rubber compounds. The powdered compounds reportedly can be directly molded into rubber articles in ordinary heated compression molds or formed into finished rubber articles by extrusion from a simple machine with no prior shear mixing and also by injection molding. Again, polysaccharide reinforcing agents are required which are unsuitable for general use applications and require modification of existing polymer formulation.

In summary, commonly used methods of forming elastomeric compounds create a heat history in the compound. These methods also limit the shelf life of the compounds. Other known methods require the use of special modified polymers to provide a homogeneous compound. Since modified elastomers are required, these methods have only limited utility.

SUMMARY OF THE INVENTION

The present invention is premised upon the realization that an injection moldable elastomer blend or compound can be formed which has not been subjected to high shear mixing. The present invention is further premised upon the realization that an elastomer compound can be formed from a powdered, unswollen elastomer in combination with a dry flowable predispersion of liquid components of the blend sorbed or dispersed on dry free flowing particulate fillers. The elastomer may be any conventional unmodified elastomer.

The powdered elastomer and predispersion are blended together using a non-shear or low shear mixer such as a ribbon blender which does not create a heat history in the polymer. This elastomer dry blend can be directly added to conventional injection or compression molding machines having a screw type extruder which will act to adequately masticate and blend the elastomer during the molding process to provide an evenly cross-linked product having a uniform distribution of components.

The absence of a heat history provides numerous advantages. Heat history refers to the effects of heat on an elastomeric blend and specifically the effects of the heat generated by blending elastomers in a high shear internal blender. This heat causes a breakdown of the polymer as well as a partial crosslinking of the polymer. In short, the elastomer once subjected to this heat no longer has the same molecular structure or molecular weight. These changes are not totally predictable nor reproducible. The heat history of an elastomer blend created during blending in a high shear internal blender varies substantially from batch to batch. Therefore each batch of compound acts differently during the molding process. Molding conditions which produce a high quality product with one batch may not produce a high quality product with a different batch. Therefore constant monitoring and adjusting of molding conditions is required to produce injection or compression molded elastomeric articles. This increases labor costs and prevents complete automation of these processes.

Thus, in accordance with this invention, by forming an elastomer powdered blend which does not have this heat history, a consistant, predictable compound can be produced time after time. Therefore when a compound formed according to the present invention is injection or compression molded there is no need to constantly monitor and adjust the process. This permits complete automation of the injection or compression molding of elastomeric parts.

This invention further reduces processing costs by eliminating the need for a preliminary high shear mixing but does not reduce the quality of the molded product. Further since the activator and cross-linking agent have not been previously masticated together with the elastomer the shelf life of the compound is substantially greater than prior art elastomer compounds. These advantages and others will be appreciated in light of the following detailed description.

DETAILED DESCRIPTION

For use in the present invention a blended elastomer compound is formed from a powdered elastomer and a dry flowable predispersion of liquid or non-dry components such as plasticizers, lubricants, waxes, etc. absorbed or dispersed on a dry filler. Such liquid components may be normally solid or semi-solid materials which are rendered liquid by the mixing action during predispersions.

Elastomers are a well known class of polymeric composition including butyl rubbers, ethylene propylene diene terpolymer (EPDM), polysulfide rubber, silicone rubber, neoprene (polychloroprene), chlorosulfonated polyethylene, acrylonitrile-butadiene copolymer (nitrile rubber), styrene butadiene copolymer, acrylonitrile butadiene copolymer-polyvinyl chloride polymer blends, polyisobutylene, polyepichlorohydrin, natural and synthetic polyisoprene, polyvinyl chloride-polybutadiene rubber, polyurethanes, fluorocarbon elastomers such as vinylidene fluoride-chlorobifluorethylene copolymers, vinylidene-fluoride-hexafluoropropylene copolymers, and fluoroacrylate elastomers as well as others.

The elastomers used in the present invention are powder elastomers having a particle size of about 20 mesh or smaller. The method of formulating the elastomer powders for use in the present invention is not critical. Any method which provides sufficiently small particle size is acceptable. One method commonly used is the spray drying of a latex elastomeric formulation. Powder elastomers formed from spray drying of a latex are well known and are commercially available. Suitable powder elastomers are also produced by grinding elastomers at extremely low temperatures or in the presence of a detackifying agent and by co-coagulation of a latex with waterglass.

The elastomeric composition of the present invention further includes reinforcing and non-reinforcing fillers, antioxidants, activators, accelerators, cross-linking or vulcanizing agents, colorants, UV stabilizers and processing aids.

Particulate fillers include reinforcing and non-reinforcing fillers and diluents. Typical fillers include kaolinite and bentonite clays, carbon black, graphite, coal dust, fumed asphalt, silicates, such as calcium silicate, magnesium silicate and aluminum silicate, precipitated, ground and fumed silica, talc, calcium carbonate, wood flour, hydrated alumina, barium sulfate, diatomaceous earth, antimony oxide titanium dioxide, mica, rubber dust, as well as other fillers well known to those of ordinary skill in the art.

Suitable antioxidants include polymerized 1,2-dihydro-2,2,4-trimethyl-quinoline, 1,3,5,-trimethyl-2,4,6-tris-(3,5,di-tertiary butyl-4 hydroxy benzyl) benzene and di-(2 methyl-4-hydroxy-5-t-butyl phenyl) sulfide. Antioxidants can be used in a weight ratio of 0.2 to about 5 phr.

Suitable vulcanizing or cross-linking agents include sulfur and sulfur containing compounds such as phosphorous containing polysulfides and sulfur chloride; N, N'-dicinnamylidene-1,6-hexanediamine oximes such as p-quinone dioxime and p,p'-dibenzoyl quinone dioxime; and peroxides such as dicumyl peroxide, 2,5-bis (t-butylperoxy)-2,5-dimethyl hexane, bis (t-butylperoxy) di-isopropyl benzene, as well as many other well known to those of ordinary skill in the art.

Suitable vulcanization accelerators include thiozales such as N-cyclohexyl-2-benzothiozale disulfide, 2-mercaptobenzothiozale; benzothiazyl disulfide, thiurams such as tetramethylthiuram monosulfide, tetramethylthiuram disulfide and dipentamethylenethiuram hexasulfide; dithiocarbamates such as Zn-dimethyl dithiocarbamate, Zn-di-n-butyl dithiocarbamate; guanidine derivatives such as diphenyl guanidine and inorganic accelerators such as hydrated lime, magnesium oxide and lead oxide.

Activators include zinc oxide and fatty acids such as stearic acid.

Plasticizers or softening agents suitable for use in the present invention include process oils, liquid paraffin, pine tar, glycerol oleate, coumaroneindene coal tar resin, di-2-ethyl hexyl phthalate and high boiling point petroleum compounds such as naphthalenic petroleum oil, aromatic petroleum oils, waxes, etc.

A dry or blend suitable for injection molding is prepared by combining the powdered elastomer with several of the additives previously mentioned, i.e., the accelerators, antioxidants, reinforcers, plasticizers and processing aids. These additives are classified into two groups: those which are dry and flowable at processing temperatures, i.e., about 20°-30° C. and those which are not dry or in other words are in a liquid or pasty state at processing temperatures. The additives cannot be directly mixed with the elastomers because they would tend to swell or agglomerate the elastomer thereby inhibiting even distribution of that component as well as others during mixing.

These liquid or non-dry additives are combined with an effective amount of powdery flowable filler to form a predispersion which is dry and flowable at room temperature. In this process it is essential that all liquids, waxes and wax-like material be premixed with dry filler to form a powder. The dry filler acts to separate the elastomer from the non-dry components preventing these non-dry components from swelling or agglomerating the elastomer particles and permitting even distribution of the material without high shear mixing. To provide a dry flowable predispersion, the filler content should range from about 25% by weight to about 95% of the total predispersion. The relative amount of dry filler must be sufficiently high to insure that the predispersion is a dry flowable powder and such that the non-dry components do not swell the elastomer once mixed. The liquid or non-dry additives are dispersed or sorbed on the dry filler by simply mixing the filler and non-dry additives in a blender or other type external mixer. Sorbed is meant to include adsorbed, absorbed and chemisorbed. Mixing is continued until a dry flowable homogenous predispersion is obtained.

A dry blend is prepared by combining the powder elastomer, the dry flowable predispersion together with any other dry additive by simply tumbling these together at room or ambient temperature. All heat and shear are avoided in order to produce a suitable dry blend having no heat history. Preferably a low shear external mixer such as a ribbon blender is used to mix the elastomer and predispersion. This mixes the elastomer and predispersion but does not masticate the elastomer.

Dry blends can be prepared with the same components and ratio of components as elastomeric formulations currently used for injection molding. The only exception is that there should be a reduction in the amount of process aids employed. Formulations, which are mixed in a high shear mixer require additional processing aids to make up for those lost during the conventional mastication cycle. Since the formulations of the present invention are combined without the generation of significant amounts of heat in an external mixer there is no loss of processing aids. Accordingly, the amount of processing aids can be reduced.

The dry blend of the present invention can be added directly to an injection molding press. Particularly suitable for use in the present invention are injection molding presses having an injection screw extruder with a length to diameter ratio of at least 15:1.

During the injection molding process the heat and shear generated in the extruder are sufficient to soften the powder elastomer and to combine the powder elastomer with the predispersion of non-dry additives in filler to form a uniform mixture suitable for curing. Typically the temperature is about 150° F. This is injected into a platen which is heated to a temperature sufficient to activate the accelerators and provide a rapid cure of the injected molded article, generally in the range of 320°-400° F.

The invention will be further appreciated in light of the following detailed examples.

EXAMPLE I

To illustrate the present invention a dry blend having the following composition was formed: 72% by weight of powder (20 mesh) Tecnoflon NML, a fluoroelastomer available from Montedison U.S.A. which is a proprietary copolymer of vinylidene fluoride and hexafluoropropylene; 15% ASTM N-770 SRF type furnace black; 3.5% light calcined magnesium oxide; 1.5% N,N'-dicinnamylidene-1,6-hexanediamine cross linking agent; and 8% of a liquid fluoropolymer, Viton LM, available from duPont (also a copolymer of vinylidene fluoride and hexafluoropropylene). The carbon black, calcined magnesium oxide and liquid fluoropolymer were premixed together to form a dry flowable predispersion of the liquid fluoropolymer and the carbon black and magnesium oxide. The elastomer combined with the predispersion was mixed in a ribbon blender to form a homogeneous gray powder.

This composition was injection molded using a Rutil Model 6020 70 ton press. The output provided using this formulation provided comparable physical properties to conventionally mixed compounds.

EXAMPLE II

The following composition was mixed in a ribbon blender at room temperature: 85% Nysynblak 9026 a product consisting of 100 parts of 35% acrylonitrile content, 50% mooney viscosity NBR (acrylonitrile-butadiene) synthetic rubber and 75 parts of an ASTM N-787 SRF type furnace process carbon black supplied by Copolymer Rubber and Chemical Corp.; 1.5% French process zinc oxide; 0.5% sulfur; 0.75% benzothiazyl disulfide accelerator; 0.25% tetramethylthiuram disulfide accelerator and 12% of a premixed dispersion. The premixed dispersion contained 40% glyceryl oleate plasticizer, 40% hard clay (kaolinite) filler, 10% polymerized trimethyldihydroquinoline (a waxy antidegradant), 2% stearic acid, and 8% microcrystalline wax. The dispersion was formed by simply blending the components together until a dry flowable powder was formed.

Thirteen days later, this powdered blend was injection molded with a Rutil Model 6020 75 ton horizontal injection press with a 15/1 length/diameter extruder. The extruder barrel and screw were maintained at about 160° F. and the platens at 380°-400° F. Excellent molded parts were obtained in 20-60 second cure cycles. Dispersion of ingredients in the resultant parts was excellent and physical properties normal.

EXAMPLE III

The following components were blended: 59% Carbomix 3651 (100 parts SBR styrene butadiene rubber, 52 parts ASTM N-234 ISAF furnace process carbon black, and 10 parts aromatic petroleum oil available as a powder from Copolymer Rubber and Chemical Corp.); 18% hard clay (kaolinite); 5% dried ground calcium carbonate; 1.5% zinc oxide; 0.4% stearic acid; 0.75% sulfur; 0.4% N-cyclohexyl-2-benzothiazole sulfenamide accelerator; 0.1% benzothiazyl disulfide accelerator; 0.1% diphenyl guanidine accelerator; 2% of a premixed powder dispersion containing 72% liquid (melting point 25° C.) coumarone-indene coal tar resin, 28% synthetic calcium silicate; and 12.75% of a dry powder premixed dispersion containing 75% light napthenic petroleum process oil and 25% synthetic calcium silicate.

The dry blend was injection molded thirteen days later using a Rutil Model 6020 75 ton horizontal injection press with a 15/1 length/ diameter screw extruder. The barrel and screw were maintained at a 160° F. and the platens at 380°–400° F. The powdered blend was poured into the feed section of the extruder. Excellent molded parts were obtained in a 20-60 second cure cycle which is typical of the cure speeds that would be expected if the compounds were mixed in a conventional manner. Dispersion of ingredients in the resultant parts was excellent and the physical properties normal.

EXAMPLE IV

The following composition was mixed in a ribbon blender at room temperature: 75% Nysynblak 9010, a powdered rubber having 100 parts of 35% ACN content 80 mooney viscosity NBR synthetic rubber and 50 parts of ASTM N-550 FEF type furnace process carbon black available from Copolymer Rubber and Chemical Corporation; 12.5% ASTM N-774 SRF type furnace black; 1.5% zinc oxide; 0.75% sulfur; 0.5% benzothiazyl disulfide accelerator; 0.75% tetramethylthiuram monosulfide accelerator and 9% of a premixed powder dispersion. The powder dispersion contained 8% polymerized trimethyldihydroquinoline, a waxy antidegradant, 8% microcrystalline wax, 4% stearic acid, 60% di-2-ethylhexyl phthalate plasticizer and 20% calcium silicate binder. Several minutes mixing yielded a homogenous black powder. This homogenous black powder was fed to a M.A.S. Hydraulic and Vulcanizing Machinery Co. Model 806 65 ton injection press operating in a horizontal mode. No modification of the standard extruder section was made. With the extruder barrel and screw at 150° F. and the platens at 400°–410° F. bushings of complex shape were molded in 30–40 second cure cycles. Dispersion of ingredients was excellent.

Samples of the above powder were also milled into strips and fed to the press conventionally. The same cure rates were obtained at the above process temperatures. A second compound was made in which the tetramethylthiuram monosulfide accelerator was replaced with tetramethylthiuram disulfide, a more rapid accelerator. Operating from powder this compound yielded satisfactory parts in 18–20 seconds under the above conditions. When milled into strip and fed conventionally satisfactory parts could not be obtained as premature vulcanization occurred in the screw and runners.

These examples demonstrate that a flowable powder elastomeric composition can be formulated with fillers, curing agents, accelerators, processing agents and the like evenly distributed throughout the formulation and without swelling the elastomer and without generation of a heat history in the elastomeric formulation. This provides for substantially more uniform and consistent results in the automatic injection molding of elastomeric parts. Further it avoids the need for a separate high shear mixing step to disperse the components throughout the elastomer and extends the shelf life of the premixed elastomeric composition. The physical form of the compound reduces labor required to injection mold elastomers.

Other embodiments of the invention will become apparent in view of the above description to a person of ordinary skill in this art and such embodiments are intended to be within the confines of this invention.

Thus having described our invention and its advantages, we claim:

1. A powdered elastomer composition for forming vulcanized products by heat-compression or injection molding comprising a homogeneous blend of
   a powdered vulcanizable elastomer, a cross-linking agent for said elastomer and
   a powdered uniform predispersion of a particulate filler and an additive sorbed in said filler, said additive normally tending to swell or agglomerate said powdered elastomer when mixed therewith, said blend of elastomer, cross-linking agent and predispersion being mixed at ambient temperature to provide a free-flowing mixture without swelling or agglomeration of said powdered elastomer.

2. The powered elastomer composition claimed in claim 1 wherein said additive is selected from the group consisting of plasticizers, liquid lubricants, liquid processing agents and waxes.

3. The powdered elastomer composition claimed in claim 1 wherein said powdered elastomer composition has substantially no heat history.

4. The powdered elastomer composition claimed in claim 1 wherein said powdered uniform predispersion includes at least about 25% filler.

5. The powdered elastomer composition claimed in claim 2 wherein said powdered uniform predispersion includes from about 5 to 75% additive.

6. The powdered elastomer claimed in claim 5 wherein said filler is selected from the group consisting of clay, carbon black, calcium silicate, silica, talc, calcium carbonate and diatomaceous earth.

7. The powdered elastomer composition claimed in claim 1 wherein said powdered elastomer is selected from the group consisting of a spray dryed latex elastomer, a coagulated latex elastomer, and a ground elastomer.

8. A powdered elastomer composition for froming vulcanized products by heat compression or injection molding comprising a homogeneous blend of
   a powdered vulcanizable elastomer formed by spray drying of a latex, a cross-linking agent for said elastomer and;
   a powdered uniform predispersion of a particulate filler and an additive sorbed on said filler, said additive normally tending to swell or agglomerate said powdered elastomer when mixed therewith and selected from the group consisting of plasticizers, liquid lubricants, liquid processing agents and waxes, said blend of elastomer, a cross-linking agent and predispersion being mixed at ambient temperature to provide a free-flowing mixture without swelling or agglomeration of said powdered elastomer and having substantially no heat history.

9. The powdered elastomer composition claimed in claim 8 wherein said filler is selected from the group consisting of clay, carbon black, calcium silicate, silica, talc, calcium carbonate, diatomaceous earth, and mixtures thereof.

10. A method of forming a powdered elastomer composition suitable for forming vulcanized products by heat compression or injection molding comprising:

sorbing an additive in an effective amount of a filler to form a powdered uniform predispersion wherein said additive normally tends to swell or agglomerate a powdered elastomer, said amount of said filler providing a flowable dry dispersion and preventing said additive from swelling or agglomerating a powdered elastomer, and blending powdered vulcanizable elastomer with said predispersion and a cross-linking agent at ambient temperature without imparting a heat history to said powdered elastomer to provide a homogeneous powdered blend.

11. The method claimed in claim 10 wherein said powdered elastomer is blended with said predispersion at about room temperature.

12. The method claimed in claim 10 wherein said predispersion comprises at least about 25% filler.

13. The method claimed in claim 10 wherein said predispersion comprises from about 5 to about 75% additive.

14. The method claimed in claim 13 wherein said filler is selected from the group consisting of clay, carbon black, calcium silicate, silica, talc, calcium carbonate, diatomaceous earth and mixtures thereof.

15. The method claimed in claim 10 wherein said powdered elastomer is selected from the group consisting of a spray dryed latex elastomer, a coagulated latex elastomer, and a ground elastomer.

16. The method claimed in claim 10 wherein said powdered elastomer is blended with said predispersion using a non-shear mixer.

17. The method claimed in claim 16 wherein said non-shear mixer is a ribbon blender.

18. The method claimed in claim 10 wherein said additive is selected from the group consisting of plasticizers, liquid lubricants, liquid processing agents and waxes.

19. A method of forming a powdered elastomer composition suitable for use in producing vulcanized products by heat compression or injection molding, said method comprising, sorbing an additive selected from the group consisting of plasticizers, liquid lubricants, liquid processing agents and waxes on a dry filler in the absence of any elastomer said filler maintained in an amount effective to provide a dry flowable predispersion of said additive on said filler which will not swell or agglomerate a powdered elastomer, and blending a powdered vulcanizable elastomer with said predispersion and a cross-linking agent for said elastomer at ambient temperature without imparting a heat history to said powdered elastomer, said powdered elastomer comprising a spray dryed latex.

20. The method claimed in claim 19 wherein said filler is selected from the group consisting of carbon black, calcium silicate, silica, talc, calcium carbonate, diatomaceous earth and mixtures thereof.

21. A method of forming a powdered elastomer blend suitable for use in producing vulcanized products by heat compression or injection molding, said method comprising sorbing an additive on a dry filler in the absence of any elastomer to form a dry flowable predispersion, said additive normally tending to swell or agglomerate an elastomer, and said filler maintained in an amount effective to prevent said additive from swelling or agglomerating an elastomer, and blending a powdered vulcanizable elastomer and cross-linking agent for said elastomer with said predispersion at ambient temperature to provide a free-flowing mixture without swelling or agglomeration of said powdered elastomer using a ribbon blender.

* * * * *